United States Patent [19]

Sechrist

[11] Patent Number: 4,980,325
[45] Date of Patent: Dec. 25, 1990

[54] METHOD OF CONTROLLING MOISTURE IN COMBUSTION SECTION OF MOVING BED REGENERATION PROCESS

[75] Inventor: Paul A. Sechrist, Des Plaines, Ill.

[73] Assignee: UOP, Des Plaines, Ill.

[21] Appl. No.: 364,754

[22] Filed: Jun. 12, 1989

[51] Int. Cl.⁵ .................. B01J 23/96; B01J 38/44; B01J 38; B01J 24; C10G 35/12
[52] U.S. Cl. .................. 502/37; 208/140; 422/216; 422/218; 422/223; 502/47; 502/48; 502/52
[58] Field of Search .................. 502/52, 50, 47, 37; 208/140

[56] References Cited
U.S. PATENT DOCUMENTS

| | | | |
|---|---|---|---|
| 3,020,240 | 2/1962 | Lockett, Jr. | 208/140 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 4,480,144 | 10/1984 | Smith | 502/52 |
| 4,724,271 | 2/1988 | Martindale et al. | 502/47 |
| 4,859,643 | 8/1989 | Sechrist et al. | 502/47 |

Primary Examiner—Paul E. Konopka
Attorney, Agent, or Firm—Thomas K. McBride; John G. Tolomei

[57] ABSTRACT

A method for continuously or semi-continuously regenerating reforming catalyst by the recirculation of a gas stream advantageously controls the water content by using an oxygen-deficient makeup gas stream to supply the oxygen for combustion of coke. The volume of makeup gas entering the process is increased by reducing its oxygen concentration so that additional waste gases from the combustion of coke on the catalyst can be vented. The venting of additional gas from the circulating gas stream lowers the overall water concentration during the combustion of coke. The oxygen-deficient makeup gas stream can be supplied by oxygen and nitrogen separation from air. Where the production of the oxygen-deficient makeup gas stream also produces an oxygen-enriched stream, the oxygen-enriched stream is advantageously added to a catalyst reconditioning step for an increased dispersion of metals in the catalyst.

10 Claims, 2 Drawing Sheets

METHOD OF CONTROLLING MOISTURE IN COMBUSTION SECTION OF MOVING BED REGENERATION PROCESS

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons are well known and extensively used. Invariably the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In order to combust coke in a typical regeneration zone, a recycle gas is continuously circulated to the combustion section and a flue gas containing by-products of a coke combustion, oxygen and water is continually withdrawn. Coke combustion is controlled by recycling a low oxygen concentration gas into contact with the coke-containing catalyst particles. The flue gas/recycle gas is continuously circulated through the catalyst particles. A small stream of makeup gas is added to the recycle gas to replace oxygen consumed in the combustion of coke and a small amount of flue gas is vented off to allow for the addition of the makeup gas. The steady addition of makeup gas and the venting of flue gas establishes a steady state condition that produces a nearly constant concentration of water and oxygen in the recycle gas.

In continuous or semi-continuous regeneration process, coke laden particles are at least periodically added and withdrawn from a bed of catalyst in which the coke is combusted. Regions of intense buring that extend through portions of the catalyst bed develop as the coke is combusted.

One problem associated with localized regions of intense coke combustion is catalyst deactivation. The combination of temperature, water vapor, and exposure time determine the useful life of the catalyst. Exposure of high surface area catalyst to high temperatures for prolonged periods of time will create a more amorphous material having a reduced surface area which in turn lowers the activity of the catalyst until it reaches a level where it is considered deactivated. Deactivation of this type is permanent, thereby rendering the catalyst unusable. When moisture is present—water is a by-product of the coke combustion—the deactivating effects of high temperature exposure are compounded.

INFORMATION DISCLOSURE

U.S. Pat. No. 3,652,231 (Greenwood et al.) shows regeneration apparatus in which a constant-width movable bed of catalyst is utilized. The '231 patent also describes a continuous catalyst regeneration process which is used in conjunction with catalytic reforming of hydrocarbons. U.S. Pat. Nos. 3,647,680 (Greenwood et al.) and 3,692,496 (Greenwood et al.) also deal with regeneration of reforming catalyst. The teachings of patents ('231, '680, and '496) are hereby incorporated in full into this patent application.

SUMMARY OF THE INVENTION

It has been discovered that the removal of moisture from a combustion section of a regeneration zone will produce geometric increases in the life of a typical reforming catalyst. In order to take advantage of this extended catalyst life, a moisture removal method that can be readily integrated into existing regeneration processes without large capital expenditures or greatly increased complexity for the system. This invention is a method of controlling the water content in the combustion section of a regeneration zone by making inexpensive alterations to the composition of the recycle gas that is used for the combustion of coke in the regeneration zone. The invention uses an oxygen-deficient gas stream to replace the oxygen that is consumed in the combustion of coke. By the use of this oxygen-deficient gas stream, additional flue gas from coke combustion can be vented from the process thereby lowering the overall moisture content of the recycle gas as it circulates through the combustion section.

Oxygen-deficient gas may be available from many sources and refers to a gas having an oxygen concentration that is less than the local air around the environment of the regeneration zone. One way in which this invention produces the oxygen-deficient gas is by diluting a gas having a given concentration of oxygen with a non-reactive gas. It is generally taught in this invention to dilute the oxygen containing gas by the removal of nitrogen from an air stream and the addition of the removed nitrogen to another air stream thereby creating a nitrogen-enriched or oxygen-deficient gas mixture. Another source of the oxygen-deficient gas stream is the vented flue gas which, after treatment for removal of moisture and contaminants, is mixed with the makeup gas to provide the oxygen-deficient gas mixture.

The oxygen deficient stream is used as makeup gas for the regeneration zone. By decreasing the concentration of oxygen in the makeup gas, a larger quantity of makeup gas must be added to the process in order to maintain a given oxygen concentration. The addition of more makeup gas requires the venting of more flue gas. Since the water concentration in the makeup gas is lower than the flue gas, an increase in the amount of gas vented decreases the water concentration in the circulating recycling flue gas. By decreasing the oxygen content of the makeup gas, it is possible to increase the venting of the flue gas while still maintaining a constant oxygen concentration in the combustion section of the regeneration zone. Thus, reducing the oxygen concentration in the makeup gas from the usual 21% oxygen found in air to about 7% will allow a three times increase in the amount of makeup gas added to the recycle gas and vented from the flue gas. For a typical regeneration process, doubling the makeup gas addition will reduce a moisture content of 4.2 mol. % to 2.5 mol.

%. For a 1200° F. combustion section temperature, this reduction of moisture will approximately double the surface area life of the catalyst. Accordingly, by using the method of this invention to reduce the moisture content in the combustion zone, catalyst performance can be greatly improved.

In one embodiment, this invention is a method of reducing the water concentration during the combustion of coke in a process for removing coke from catalyst particles in a regeneration zone. The particles move to the regeneration zone in at least semi-continuous flow. The catalyst particles containing coke pass into the regeneration zone and form a vertically-elongated bed of particles in a combustion section of the regeneration zone. At least periodically, the particles are transported down the bed by withdrawing particles from the bottom of the bed and transporting particles to the top of the bed. An oxygen-containing recycle gas is passed through the bed to combust coke and produce a flue gas comprising by-products of coke combustion which include $CO_2$ and water. The flue gas is withdrawn from the regeneration zone and a portion of the flue gas is rejected from the process. The remaining portion of the flue gas is combined with makeup gas to form a recycle gas. The makeup gas has an oxygen concentration that is less than ambient air.

In a further embodiment, this invention is a method of reducing the water concentration during the combustion of coke in a process for removing coke from catalyst particles. Again, the catalyst particles move to the regeneration zone in at least semi-continuous flow. The particles containing coke deposits are passed into the regeneration zone and form a vertically-elongated bed in a combustion section and a halogenation section of the regeneration zone. The particles are transported downward through the bed by at least periodically withdrawing particles from the bottom of the bed and adding catalyst particles to the top of the bed. A recycle gas having an oxygen concentration of from 0.5 to 1.5 mol. % passes through the particles in the combustion section to combust coke and produce a flue gas. The flue gas is withdrawn from the regeneration zone and a portion of it is vented to remove flue gas from the process. An air stream is divided into an oxygen-deficient stream having an oxygen concentration of less than 12 mol. % and an oxygen-enriched stream. The remaining portion of the flue gas is combined with a makeup gas that comprises the oxygen-deficient gas in an amount equal to at least 5 mol. % of the remaining flue gas to produce the recycle gas stream. Particles in the halogenation section pass into a drying section of the regeneration zone where the particles are contacted with a drying gas that comprises at least a portion of the oxygen-enriched stream. The drying gas passes from the drying section into the halogenation section and a halogenation gas also passes into the halogenation section. The halogenation gas and the drying gas are collected directly from the halogenation section. Clean catalyst particles containing essentially no coke are removed from the drying section.

Other objects, embodiments and advantages of this invention are discussed in the following detailed description.

DETAILED DESCRIPTION OF THE INVENTION

Figure 1:
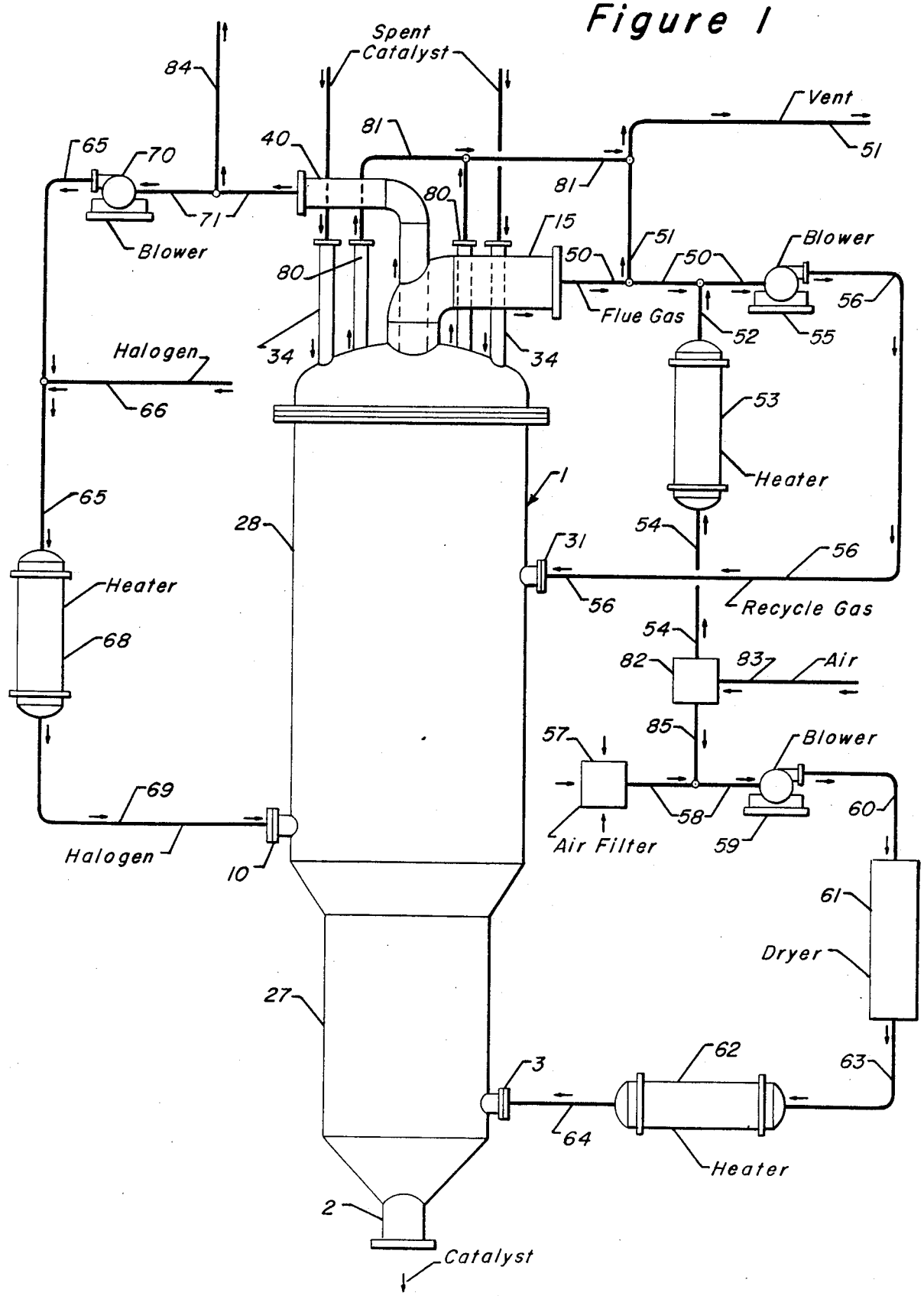
FIG. 1 is a schematic illustration of a regeneration zone and some of the equipment associated therewith.

In its broadest terms, this invention can be used to reduce the concentration of water in any process that consumes oxygen and produces water as a by-product. One such application that requires reduction of water concentration is in the removal of coke from catalyst particles in a regeneration zone. The coke is oxidized at high temperatures to form carbon dioxide, carbon monoxide and water. Temperatures for coke combustion are in excess of 700° F. In this reaction, a high water content, over time, has a deleterious affect on the activity of the catalyst. With continued exposure to high temperatures in a high moisture content environment, the catalyst will lose surface area and as a result become permanently deactivated. However, it is not necessary to limit this invention to coke combustion or regeneration processes since it may be generally applicable to other processes that use a recycle stream to supply a low oxygen concentration gas to an oxygen-consuming and water-producing reaction.

However, the most widely practiced hydrocarbon conversion process to which the present invention is applicable is catalytic reforming. Therefore the discussion of the invention contained herein will be in reference to its application to a catalytic reforming reaction system. It is not intended that such discussion limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide.

The halogen is normally chlorine. Alumina is a commonly used carrier. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 m$^2$/g. It has been discovered that removal of moisture from a combustion zone for a reforming zone will produce a more than linear increase in the life of a typical reforming catalyst. The particles are usually spheroidal and have a diameter of from about 1/16th to about ⅛th inch (1.5–3.1 mm), though they may be as large as ¼th inch (6.35 mm). In a particular regenerator, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reformer will employ a moving bed reaction zone and regeneration zone. The present invention is applicable to a moving bed regeneration zone and a fixed bed regeneration zone and a fixed bed. Fresh catalyst particles are fed to a reaction zone, which may be comprised of several subzones, and the particles flow through the zone by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

When using the method of this invention in a batch, continuous, or semi-continuous catalyst regeneration process, catalyst is contacted with a hot oxygen-containing gas stream (known in reforming processes as recycle gas) in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation to carbon monoxide, carbon dixoide, and water. Coke content of spent catalyst may be as much as 20% of the catalyst weight, but 5-7% is a more typical amount. Within the combustion zone, coke is usually oxidized at temperatures ranging from 900° to 1000° F., but temperatures in localized regions may reach 1100° F. or more.

Oxygen for the combustion of coke enters what is called a combustion section of the regeneration zone in what has been termed a recycle gas. The recycle gas contains a low concentration of oxygen usually on the order of 0.5 to 1.5% by volume. The arrangement of a typical combustion section may be seen in U.S. Pat. No. 3,652,231. As the coke is combusted, the small amount of hydrogen within the coke reacts with the oxygen to form water. Flue gas made up of carbon monoxide, carbon dioxide, water and unreacted oxygen and other non-reactive gases are collected from the combustion section and withdrawn from the regeneration zone as flue gas. Thus, the recycle gas and flue gas form a recycle gas loop wherein flue gas is continually withdrawn from the process mixed with an oxygen-containing gas to replenish consumed oxygen and returned to the combustion section as recycle gas. A small amount of the flue gas is vented off from the process to allow the addition of an oxygen-containing gas called makeup gas. The oxygen-containing gas is combined with the flue gas to replace the oxygen consumed by the coke combustion and the combined gas is recycled to the combustion section. In the past, the oxygen-containing gas was typically air. The amount of air needed in past regeneration processes to replenish the oxygen consumed during the coke combustion is relatively small, about 3% of the volumetric rate of the recycle gas stream.

All of the oxygen supplied to an upper region of the bed is consumed, since an abundant amount of coke is present. As catalyst particles move downward in the bed and coke is removed, a point is reached where less than all of the oxygen delivered is consumed. This is termed the breakthrough point. Typically, breakthrough occurs at a location spaced about half the distance down the total length of the bed in the combustion section. It is known to those skilled in the art that catalyst particles of the type used in the hydrocarbon conversion processes of this invention have a large surface area, which results from the existence of a multiplicity of pores. When the catalyst particles reach the breakthrough point in the bed, the coke left on the surface of the particles is deep within the pores and therefore the oxidation reaction occurs at a much slower rate.

Reiterating again, the combustion of coke also produced water. The only place for the water to escape from the process is in the small amount of vented flue gas. Therefore, the water concentration in the recycle loop increases until the difference between the amount of water entering with the makeup gas stream and the amount of water leaving with the vent stream equal the amount of water produced during the combustion of coke and equilibrium is reached. The water circulating within the recycle gas loop created a constant steam concentration during the coke combustion process. The water concentration in the recycle loop could be lowered by drying the air that made up the makeup gas or installing a drier for the gas circulating in the recycle gas loop. Again, due to the relatively low native moisture content of the makeup gas, drying the makeup gas air would not significantly reduce the water in the recycle gas loop. Due to the large volume and high temperature of the recycle gas, recycle gas drying would be expensive and difficult to carry out.

The makeup gas stream, in the method of this invention, has an oxygen concentration that is less than the air in the environment around the regeneration zone. Maintaining a desired oxygen concentration in the recycle gas requires a greater addition of makeup gas when its oxygen concentration is reduced. With the greater addition of makeup gas, additional flue gas is vented. The amount of water removed by the venting of flue gas remains relatively constant but, the greater volumetric flow rate of gas vented from the recycle loop lowers the equilibrium and reduces the overall water concentration in the recycle gas.

In a preferred embodiment of this invention, some or all of the vented flue gas is withdrawn directly from an upper portion of a vertically extended catalyst bed. The formation of water occurs very rapidly upon exposure of the coke to the oxygen in a combustion section. Flue gas exiting the upper portion of the catalyst bed will contain a higher concentration of water than flue gas exiting the lower portions of the bed. By the selective withdrawal of gas from an upper portion of the bed, the flue gas having the highest concentration of water is removed from the recycle gas loop. Consequently, the smaller addition of water to the recycle gas loop further lowers the water concentration therein.

Suitable makeup gas streams having an oxygen content less than air can be obtained by a variety of methods. A typical makeup gas stream for this invention will have a maximum oxygen concentration of from 10 to 12 mol. % and preferably will have an oxygen concentration of less than 7 mol. %. A number of processes are known for enriching air streams with oxygen or nitrogen. These processes can use selective adsorbents, gas permeable membranes or a combination of both to generate such streams. One such process that uses a gas permeable membrane to enrich an oxygen stream and produce a non-permeate gas stream with an increased nitrogen concentration is shown in U.S. Pat. No. 4,787,919, the teachings of which are hereby incorporated by reference. This gas system has the added advantage of simultaneously reducing the moisture content of the non-permeate nitrogen stream. Additional diffusion membranes for the separation of gases are also shown in U.S. Pat. No. 3,830,733, the teachings of which are herein incorporated by reference. These and other commercially available processes can economically produce nitrogen-enriched gas streams having oxygen concentrations of 7% or less.

Another method of producing the oxygen-deficient makeup gas stream uses the vented flue gas. This method, in simplest form, recycles a portion of the vented flue gas and mixes it with the makeup air. The vented flue gas consists of nitrogen, carbon dioxide, water vapor, oxygen, hydrogen chloride, chlorine and sulfur dioxide; its temperature is in excess of 900° F. Wet scrubbing can be used to remove the chlorides and SO$_2$. In fact, it is already common practice in some regeneration zones to remove the chlorides and sulfur compounds from the vented flue gas by wet scrubbing. Additionally, once a scrubber is in place, the flue gas exiting the scrubber is near ambient temperature, and is easily recompressed, dried and recycled to the makeup gas stream. Mixing a treated flue gas stream with the makeup gas can be more cost-effective, from the standpoint of both energy and capital, than using an oxygen/nitrogen membrane for producing the oxygen-deficient gas stream. The advantages of using a treated flue gas stream are most evident in regeneration zones that operate at superatmospheric pressure where the higher pressure, usually in the range of 15 to 50 psi, reduces the concentration of water in the flue gas as it exits the scrubber.

Below the combustion section, the regeneration zone will usually include additional treatment steps for the catalyst. One such step is a halogenation step. The halogenation step provides the means of incorporating and maintaining the desired level of halogen in the final catalytic composite. The halogen adjustment step employs a halogen, or halogen-containing compound in air or an oxygen atmosphere. The preferred halogen for incorporation into the catalytic composite is chlorine. The preferred halogen or halogen-containing compound utilized during the halogenation step is chlorine, HCl or a precursor of these compounds. An oxygen atmosphere is generally employed and desired in carrying out the halogenation step. The presence of oxygen aids in the dispersion of the metallic catalyst components on the carrier. A lower water concentration in the environment of the combustion section can facilitate the halogenation step as catalyst with a lower water content drops downward into the halogenation section of the regeneration zone. The concentration of chlorine in the halogenation section is governed by the Deacon equilibrium equation.

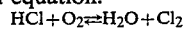
$$HCl + O_2 \rightleftharpoons H_2O + Cl_2$$

Therefore, to the extent that the catalyst entering the halogenation section has a lower water concentration it will shift the equation to the right to produce more chlorine for the halogenation step. Since oxygen aids in the redispersion of platinum, additional benefits are obtained by the method of this invention when the production of the oxygen-deficient makeup gas stream also produces an oxygen-enriched stream that may be passed into the halogenation section to increase the oxygen concentration and further promote the dispersion of the catalytic metal on the carrier. However, when an oxygen-enriched gas is introduced into the halogenation zone, it must not be vented through the combustion zone; to do so would increase the oxygen concentration in the recycle gas and negate the effects of the oxygen-deficient makeup gas.

After passing to the combustion zone and halogenation zone, the catalyst is usually passing into a drying zone for the removal of water formed in the combustion zone and remaining on the catalyst particles. The typical arrangement for drying the particles charges a heated air stream into the drying section of the regeneration zone and contacts the particles in countercurrent flow. Relatively dry catalyst particles are withdrawn from the bottom of the regeneration zone and the water-containing oxygen gas stream flows upward out of the drying section.

The water-laden gas stream usually enters the halogenation section to supply the desired oxygen in the combustion section. Gas from the drying section and halogen-containing gas mix in the halogenation section and can either flow upward into the combustion section or be removed prior to entering the combustion section. Since the gas from the halogenation section will usually contain a relatively large water concentration, it is desirable to separately withdraw this gas stream before it enters the combustion section. Again, in order to accomplish the purposes of this invention, a separate collection of gas from the halogenation section will be necessary when an oxygen-enriched stream is charged thereto.

The coke content of catalyst exiting the combustion section is approximately 0.2% or less of the weight of the catalyst. Much of this residual coke is burned off in the halogenation zone or, if the halogenation zone is omitted, in the drying zone. Were catalyst leaving the combustion section to have on it a larger amount of coke, the temperature in the section below the combustion section would rise to an unacceptably high value, as a result of the heat of combustion.

The increased addition of makeup gas can also provide the necessary cooling for the recycle gas stream. It is now typical to provide a cooler in the recycle loop in order to cool the flue gas and keep the recycle gas within a temperature range sufficient to initiate coke burning but below a temperature that will cause catalyst deactivation; this is usually about 850°–950° F. with a temperature of 890° F. being particularly preferred. With the addition of sufficient makeup gas, no further cooling of the recycle gas is needed to achieve the desired temperature for the recycle loop. Thus, the cost of providing a cooler in the recycle line is avoided. In fact, with the addition of sufficient makeup gas, it may be desirable to add a small heater to make fine temperature adjustments in the temperature of the recycle gas.

The simple and effective water removal method of this invention allows the regeneration zone to be operated more profitably. The presence of moisture in the combustion section decreases the catalyst surface area and shortens its life, thereby creating higher catalyst replacement cost. The small cost associated with the production of the oxygen-deficient makeup gas stream is much smaller than the cost associated with catalyst replacement. Therefore, in balance, overall cost for the regeneration process are reduced. Further cost advantages are realized when an oxygen-enriched stream is produced along with the oxygen-deficient makeup gas stream so that conditioning of the catalyst in the halogenation section is enhanced.

Figure 2:
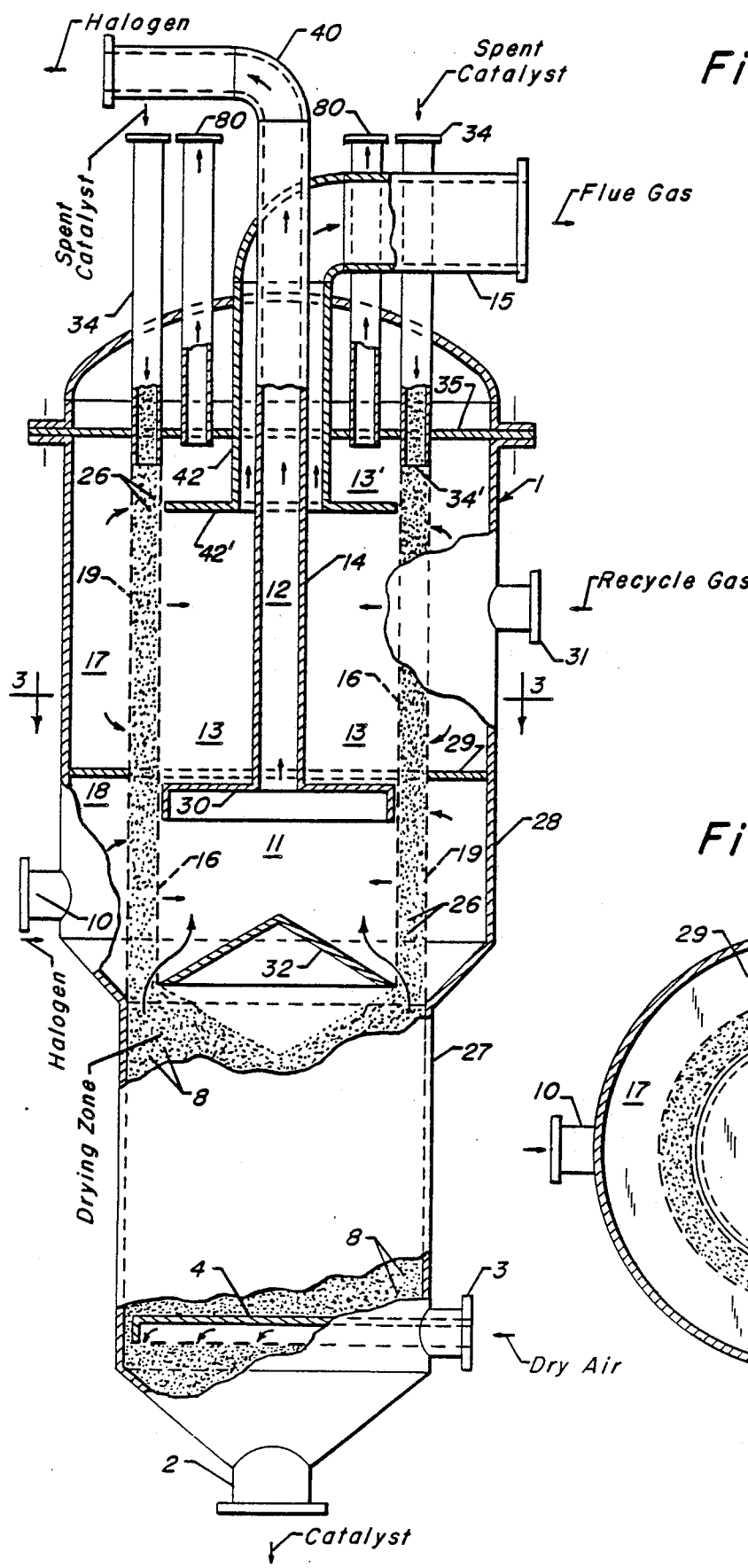
FIG. 2 is a partial cross-sectional elevation of the regeneration zone shown in FIG. 1.
Figure 3:
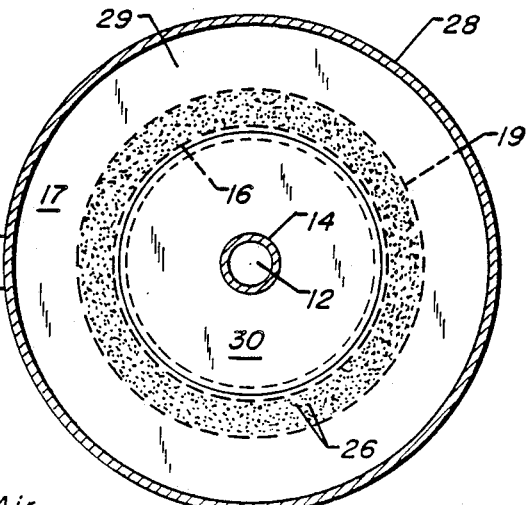
FIG. 3 is a section of the reaction zone taken across line 33 of FIG. 2.

FIGS. 1-3 will now be utilized in describing a specific example of the invention; such use is not intended to limit the broad scope of the invention as presented in the claims. The Drawings show only elements and equipment which are essential to a clear understanding of the invention. Application and use of additional required items is well within the purview of one skilled in the art. U.S. Pat. Nos. 3,652,231, 3,647,680 and 3,692,496, which have been made a part of this document, may be consulted for additional detailed information.

Referring now to FIG. 1, spent catalyst particles are introduced into regeneration vessel 1 by means of nozzles 34. Catalyst is removed from regenerator 1 at the lower end through nozzle 2. Regenerator 1 has an upper section 28 and a lower section 27.

Flue gas leaves the upper section of the regeneration vessel through nozzles 15 and 80. Flue gas exiting through nozzle 15 is conveyed to blower 55 by pipeline 50. A portion of the flue gas leaving the regenerator through pipeline 50 is vented from the system by pipeline 51. Additional flue gas is removed from the system by pipeline 81 that connects nozzles 80 with line 51. Makeup gas is heated by passage through heater 53 and added to the flue gas by pipeline 52. Heater 53 heats the recycle gas to carbon-burning temperatures during start-up and to a lesser degree adds heat to the recycle stream during normal operation. Once the makeup gas is added to the flue gas, the combined gas stream is usually denoted "recycle gas." Recycle gas leaving blower 55 through pipeline 56 enters the regenerator through nozzle 31. Pipelines 50 and 56 together with a hereinafter described combustion section form a recycle loop.

A gas separation system 82 supplies makeup gas to the recycle loop. Air enters gas separation system 82 by a pipeline 83. Separation system 82 produces an oxygen-deficient gas stream, carried by pipeline 54 and an oxygen-enriched gas stream carried by pipeline 85. The oxygen-deficient makeup gas is added to the recycle gas at a volumetric rate generally equal to the amount of gas vented from line 51.

FIG. 1 also depicts a halogenation loop for performing the halogenation step. A halogenation gas stream is provided to the halogenation section of the regenerator by nozzle 10. The halogenation gas exits the regenerator through nozzle 40 and is conveyed to heater 68 by pipelines 71 and 65 and by blower 70. Makeup halogen is added to the halogenation gas by pipeline 66. After the halogenation gas is heated, it passes through pipeline 69 to regenerator upper section 28. In a manner hereinafter described, the halogenation gas is kept separate from the flue gas and recycle gas until removed from the regeneration by nozzle 40. Gas is vented from the vented from the halogenation loop by line 84.

Air from the atmosphere is drawn through filers 57 and pipeline 58 by blower 59. An oxygen-enriched stream from pipeline 85 is also drawn into pipeline 58. The oxygen-enriched stream and the air stream provide a drying gas that passes from blower 59 through a pipeline 60 and into a dryer 61 for water removal before entering a heater 62 via a pipeline 63. The air stream is heated in heater 62 and passed into lower regenerator section 27 via pipeline 64 and nozzle 3. Drying gas is combined with gas from the halogenation loop and eventually exits the process through pipeline 84.

Referring now to FIG. 2, outer and inner catalyst retention screens 16 and 19 extend vertically within the upper section 28 of regeneration vessel 1. Outer screen 19 and inner screen 16 are cylindrical in form. The two catalyst retention screens have a central axis common with the central axis of the regeneration vessel. Screens 16 and 19 form a catalyst retention space through which a descending annular column of catalyst shown as bed 26, moves by gravity. Nozzles 34 deliver catalyst at points spaced around the annular bed. The catalyst screens have openings sufficiently small to preclude catalyst particles from passing through the screens. For a description of catalyst retention means, U.S. Pat. No. 3,652,231 may be consulted. The catalyst retention screens extend throughout the upper sectin of vessel 1 and deliver catalyst to the lower section 27 of regenerator 1.

The portion of the upper section of vessel 1 which is above a horizontal partition 29 is termed a combustion section. A space for distributing recycle gas around the catalyst bed is formed between screen 19 and the sidewall of regeneration vessel 1 in upper section 28 and is divided by partition 29. Partition 29 forms a barrier between a recycle gas distribution space 17 and a halogenation gas distribution space 18. Recycle gas enters the space 17 through recycle gas nozzle 31. A partition 35 provides a top closure for space 17. Recycle gas flows radially, or horizontally, from space 17 through bed 26 to a central space 13. A halogen conduit 14 occupies a portion of space 13. A lower boundary for central space 13 is provided by enlarged end 30 of conduit 14. A top collection space 13' is separated from central space 13 by an annular plate 42' at the bottom of conduit 42. Annular plate 42' provides a top closure for central space 13 and a bottom closure for upper space 13'. Central space 13 is termed a primary flue gas collection space. Conduits 42 and 14 and the catalyst nozzles 34 pass through partition 35. Conduit 42 is an extension of nozzle 15 that communicates nozzle 15 with gas collection space 13. Conduit 14 extends from nozzle 40 and passes through collection space 13.

Top collection space 13' collects flue gas from the uppermost portion of bed 26. Partition 35 provides the top closure for collection space 13' and conduit 42 forms the innermost boundary. Annular plate 42' is typically positioned so that the uppermost 5–15% of the open area of the screen 16 within the combustion section borders space 13'. The length of collection space 13' is usually sized so that the gas flow into space 13' equals the makeup gas flow. Top collection space 13' collects the flue gas having the higher water content from the collection section. This high moisture content flue gas is withdrawn from collection space 13' by nozzles 80 that pass through partition 35 and communicate with space 13'.

The portion of upper regenerator section 28, located below partition 29, is termed a halogenation section. A halogen-containing gas enters the zone via halogenation nozzle 10, flows into halogenation gas distribution space 18, and then flows through the catalyst in a radial manner before entering a halogenation collection space 11. A lower boundary of distribution space 18 is formed by a necked-down portion of the regenerator at the bottom of upper section 28. End closure 30 of conduit 14 forms the upper boundary and end closure 32 forms the lower boundary of collection space 11. The outer edges of end closure 30 are positioned close to screen 16 to prevent the moisture-rich and high-oxygen concentration gas in the halogenation section from mixing with the flue gas in space 13.

Screen 19 extends a short distance into the lower section 27 of vessel 1, which is of a smaller diameter than the upper section. The outside diameter of screen 19 is slightly smaller than the inside diameter of lower section 27. Catalyst discharged from bed 26 fills all of lower section 27 of vessel 1 and forms a bed 8 that provides a drying section. Catalyst moves downward through the lower section of the vessel and out of the vessel through catalyst outlet nozzle 2.

Nozzle 3 on regeneration vessel 1 is equipped with means for distributing air, consisting of perforated pipe 4, to various points in a horizontal plane which is perpendicular to the descending catalyst. Pipe 4 distributes air uniformly up the column so that it contacts all of the catalyst in bed 8.

Air entering the vessel via pipe 4 has been dried so that it contains no more than about 5 parts per million (by volume) of water and has also been heated. The hot air passes upwardly through bed 8 removing moisture which is contained on the catalyst. Essentially all of the air moving up the column lower section passes into collection space 11. The air stream from the drying zone mixes with gas which has passed through the catalyst from distribution space 18 to collection space 11 and the combined stream enters halogen conduit 14 to flow out of the regeneration vessel via halogen nozzle 40. The vessel is designed so that substantially all of the gas in central space 11 enters conduit 14. By substantially it is meant that between 80 and 100% of the air from central space 11 enters conduit 14. In the embodiment of FIG. 2, this is accomplished by enlarged end 30.

FIG. 3 depicts a portion of the conduit and screen arrangements. Halogen conduit 14 having an interior 12 is centered on the vertical axis of the vessel. Catalyst retentions screens 16 and 19 enclose the downward moving bed of catalyst 26. Gas in gas distribution space 17 flows radially through the catalyst to central space 13.

The regeneration zone can be designed so that a portion of halogenation gas which passes through the bed in the halogenation zone enters central space 13, by placing the end portion 30 of conduit 14 below partition 29. In this way, gas passing through the catalyst in the burn zone can provide some of the oxygen for combustion of carbon on catalyst in the burn zone and then mix with the portion of upwardly flowing gas from the halogenation zone that did not enter conduit 14. Of course, the amount of such gas should be limited so that most of the oxygen for combustion is provided by the addition of makeup gas through conduit 52.

For a typical regeneration zone, the rate of catalyst movement through a 6 inch (15.2 cm) constant-width bed or a tapered bed varying from a 3 inch (7.6 cm) thickness to a 9 inch (22.9 cm) thickness may range from as little as 200 pounds per hour (90.7 kg) to 1000 pounds per hour (453.6 kg) or more. Typical bed lengths for this range of catalyst flow rate are from about 4 feet (1.22 m) to about 20 feet (6.1 m). The diameter of the inner catalyst retention screen at the top will often be in excess of 36 inches (0.91 m), in order to accomodate a 36 inch flue gas pipe. Where larger catalyst movement rates are required, bed thickness may be increased. For example, for a 2000 pound per hour (907.2 kg) catalyst flow rate, a constant-width bed may be 9 inches (22.86 cm) thick. Bed length will be about 13 feet (5.15 m).

FIG. 1 shows the method of this invention being practiced with a system 82 that produces an oxygen-deficient gas stream. An alternative to system 82 is the use of the vented flue gas from line 51 as the source of the oxygen-deficient gas stream. For example, supplying the oxygen-deficient gas to a regeneration zone having a 2000 pound per hour catalyst flow rate would require recompressing about 10,000 standard cubic feet per hour of the wet vent gas. In many cases, it will take a fraction of the power to recompress the vent gas as opposed to the power requirements for operating a membrane system for recovering an oxygen-deficient gas stream. Capital costs for the necessary equipment to use the vent gas, such as scrubbers and driers, are usually lower than the cost of a membrane system. Therefore, the use of vented flue gas as a source of an oxygen-deficient gas can have cost advantages.

Using vented flue gas, as the source of the oxygen-deficient gas stream, also increases the carbon dioxide concentration of the flue gas to about 17% as compared to about 8% when the membrane system is used. This increase in $CO_2$ comes at the expense of decreased nitrogen. Increasing the $CO_2$ yields two minor benefits; the recycle gas has a higher heat capacity which lowers the peak temperature in the regeneration zone and the compressor gas flow is increased by the higher gas molecular weight.

The description of this invention in the context of a preferred regeneration arrangement is not intended to limit its application to the details shown therein. The method of this invention can be used advantageously to control the water content in a recirculating gas stream for any oxygen-consuming process that produces water.

What is claimed is:

1. A method of regenerating catalyst particles from a catalytic reforming process that have become deactivated in a catalytic reforming process by removing coke from the catalyst particles in a regeneration zone through which the particles move in at least semi-continuous flow, said catalyst particles comprising a Group VIII metal and a halogen on an alumina carrier having a surface area of at least 100 $m^2$/gram, said method comprising:
   (a) passing catalyst particles containing coke deposits into said regeneration zone;
   (b) forming a vertically-elongated bed of said particles in a combustion section and halogenation section of said regeneration zone;
   (c) at least periodically moving said particles down said bed from said combustion section to said halogenation section by withdrawing particles from the bottom of said bed and adding catalyst particles to the top of said bed;
   (d) passing a recycle gas stream having an oxygen concentration of from 0.5 to 1.5 mol. % through the particles in said combustion section to combust coke and produce a flue gas stream comprising by-products of coke combustion, said flue gas stream having an $H_2O$ concentration of less than 5 mol. %
   (e) withdrawing said flue gas stream having a first concentration of water from said regeneration zone and venting a portion of said withdrawn flue gas stream to remove said flue gas stream from said process;
   (f) dividing an air stream into an oxygen-enriched stream having an oxygen concentration greater than air and an oxygen-deficient stream having an oxygen concentration of less than 12 vol. % and a water concentration less than said first concentration;
   (g) combining the remaining portion of said flue gas stream with a make-up gas stream comprising said oxygen-deficient gas in an amount equal to at least 5 vol. % of said remaining flue gas stream to produce said recycle gas stream;
   (h) passing said particles from said halogenation section into a drying section and contacting said particles with a drying gas stream comprising at least a portion of said oxygen-enriched stream mixed with air;
   (i) passing said drying gas stream from said drying section into said halogenation section and passing a halogenation gas stream into said halogenation section;
   (j) collecting a majority of said halogenation stream gas and said drying gas stream directly from said halogenation section; and
   (k) recovering catalyst particles containing less than 0.2 wt. % coke from said drying section.

2. The process of claim 1 wherein said makeup gas stream cools said recycle gas stream to a temperature below 950° F.

3. The process of claim 1 wherein said oxygen-enriched stream and said oxygen-deficient stream are produced by separating nitrogen from air, such that concentration of nitrogen in said oxygen-deficient stream is increased, and the concentration of nitrogen in said oxygen-enriched stream is decreased.

4. The process of claim 1 wherein said portion of said flue gas stream that is removed from said process is taken from an upper portion of said vertically-elongated bed of particles in said combustion section.

5. The process of claim 2 wherein the flue gas stream exiting from at least the upper 5% of the elongated bed in said combustion section is removed from the process.

6. A method of regenerating catalyst particles from a catalytic reforming process that have become deactivated in a catalytic reforming process by removing coke from the catalyst particles in a regeneration zone through which the particles move in at least semi-continuous flow, said catalyst particles comprising a Group VIII metal and a halogen on an alumina carrier having a surface area of at least 100 $m^2$/gram, said method comprising:
   (a) passing catalyst particles containing coke deposits into said regeneration zone;
   (b) forming a vertically-elongated bed of said particles in a combustion section and halogenation section of said regeneration zone;
   (c) at least periodically moving said particles down said bed from said combustion section to said halogenation section by withdrawing particles from the bottom of said bed and adding catalyst particles to the top of said bed;
   (d) passing a recycle gas stream having oxygen concentration of from 0.5 to 1.5 mol. % through the particles in said combustion section to combust coke and produce a flue gas stream comprising by-products of coke combustion, said flue gas stream having an $H_2O$ concentration of less than 5 mol. %;
   (e) withdrawing said flue gas stream from said regeneration zone;
   (f) separating a vent gas stream from said flue gas stream, drying at least a portion of said vent gas stream, and combining said portion of said vent gas stream with an oxygen-containing gas stream to produce a make-up gas stream having an oxygen concentration of less than 12 vol. %;
   (g) combining the remaining portion of said flue gas stream with said make-up gas stream in an amount equal to at least 5 vol. % of said remaining flue gas stream to produce said recycle gas stream;
   (h) passing said particles from said halogenation section into a drying section and contacting said particles with a drying gas stream comprising an oxygen-enriched stream having an oxygen concentration greater than air;
   (i) passing said drying gas stream from said drying section into said halogenation section and passing a halogenation gas stream into said halogenation section;
   (j) collecting a majority of said halogenation gas stream and said drying gas stream directly from said halogenation section; and
   (k) recovering catalyst particles containing less than 0.2 wt. % coke from said drying section.

7. The process of claim 6 wherein said makeup gas stream cools said recycle gas stream to a temperature below 950° F.

8. The process of claim 6 wherein said regeneration zone operates at a pressure of at least 15 psi.

9. The process of claim 8 wherein said portion of said vent gas stream that is treated for the removal of chlorine and sulfur compounds and recompressed before being dried and combined with an oxygen-containing gas stream.

10. The process of claim 9 wherein said oxygen-containing gas stream is air.

* * * * *